United States Patent
Riley et al.

(10) Patent No.: US 12,300,045 B2
(45) Date of Patent: May 13, 2025

(54) SYSTEMS AND METHODS FOR SENDING VEHICLE INFORMATION AND HEALTH DATA OVER A WIRELESS NETWORK

(71) Applicant: Cox Communications, Inc., Atlanta, GA (US)

(72) Inventors: Peyton Riley, Atlanta, GA (US); Matt Shorts, Atlanta, GA (US); Spencer Fowler, Atlanta, GA (US); Oluwafemi Adeyemi, Atlanta, GA (US); Mark Barton, Atlanta, GA (US); Barak Weinisman, Atlanta, GA (US); Altan Stalker, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 250 days.

(21) Appl. No.: 17/651,886

(22) Filed: Feb. 21, 2022

(65) Prior Publication Data
US 2023/0267774 A1    Aug. 24, 2023

(51) Int. Cl.
| G07C 5/08 | (2006.01) |
| G07C 5/00 | (2006.01) |
| H04W 4/38 | (2018.01) |
| H04W 4/40 | (2018.01) |

(52) U.S. Cl.
CPC .......... *G07C 5/0808* (2013.01); *G07C 5/008* (2013.01); *G07C 5/0816* (2013.01); *G07C 5/0841* (2013.01); *H04W 4/38* (2018.02); *H04W 4/40* (2018.02)

(58) Field of Classification Search
None
See application file for complete search history.

(56) References Cited

U.S. PATENT DOCUMENTS

| 6,553,292 B2 | 4/2003 | Kokes et al. |
| 6,677,854 B2 | 1/2004 | Dix |
| 6,678,591 B2 | 1/2004 | Ohmura et al. |
| 6,735,503 B2 | 5/2004 | Ames |
| 6,933,842 B2 | 8/2005 | Oesterling et al. |
| 7,096,101 B2 | 8/2006 | Sonnenrein et al. |
| 7,155,321 B2 | 12/2006 | Bromley et al. |
| 7,359,774 B2 | 4/2008 | Grenn |
| 7,979,178 B2 | 7/2011 | Bertosa et al. |

(Continued)

FOREIGN PATENT DOCUMENTS

| WO | 2019/057188 | 3/2019 |
| WO | 2021/035634 | 3/2021 |
| WO | 2021/042241 | 3/2021 |

*Primary Examiner* — Tuan C To
*Assistant Examiner* — David Ruben Pedersen
(74) *Attorney, Agent, or Firm* — Eversheds Sutherland (US) LLP

(57) ABSTRACT

Systems and methods are disclosed for sending vehicle information and health data over a wireless network. An example method may include receiving, from an on-board diagnostic (OBD) device associated with a vehicle and over a LoRaWAN network, a first message including first data, wherein the first data is a first category of data received by the OBD device from the vehicle. The example method may also include receiving, from the OBD device and over the LoRaWAN network, a second message including second data, wherein the second data is a second category of data received by the OBD device from the vehicle.

13 Claims, 12 Drawing Sheets

(56) References Cited

U.S. PATENT DOCUMENTS

| | | |
|---|---|---|
| 8,744,668 B2 | 6/2014 | Selkirk et al. |
| 8,996,230 B2 | 3/2015 | Lorenz et al. |
| 9,047,719 B2 | 6/2015 | Yagi et al. |
| 9,224,253 B2 | 12/2015 | Kakinuma |
| 9,245,393 B2 | 1/2016 | Yagi et al. |
| 9,317,840 B2 | 4/2016 | Kleinschmidt et al. |
| 9,401,054 B2 | 7/2016 | Fountain et al. |
| 9,513,789 B2 | 12/2016 | Marshall et al. |
| 9,607,448 B2 | 3/2017 | Ukai et al. |
| 9,619,946 B2 | 4/2017 | Huang et al. |
| 10,156,960 B2 | 12/2018 | Marshall et al. |
| 10,606,445 B2 | 3/2020 | Marshall et al. |
| 10,666,767 B1* | 5/2020 | Floyd .................. H04L 9/3247 |
| 10,706,645 B1 | 7/2020 | Herron et al. |
| 10,748,354 B2 | 8/2020 | Liu et al. |
| 10,852,910 B2 | 12/2020 | Marshall et al. |
| 10,964,134 B2 | 3/2021 | Frisch et al. |
| 11,513,814 B1* | 11/2022 | Luban .................. G06F 1/3215 |
| 2002/0103583 A1 | 8/2002 | Ohmura et al. |
| 2005/0234616 A1 | 10/2005 | Oliver et al. |
| 2005/0251304 A1 | 11/2005 | Cancellara et al. |
| 2006/0101311 A1 | 5/2006 | Lipscomb |
| 2006/0106508 A1 | 5/2006 | Liebl et al. |
| 2006/0122748 A1 | 6/2006 | Nou |
| 2006/0136104 A1 | 6/2006 | Brozovich et al. |
| 2008/0109130 A1 | 5/2008 | Huang |
| 2009/0265055 A1 | 10/2009 | Gillies |
| 2010/0042287 A1 | 2/2010 | Zhang et al. |
| 2012/0116609 A1 | 5/2012 | Jung et al. |
| 2014/0121888 A1 | 5/2014 | Guo et al. |
| 2015/0134192 A1 | 5/2015 | Kakinuma |
| 2015/0170435 A1 | 6/2015 | Ko |
| 2018/0293811 A1 | 10/2018 | Liu et al. |
| 2018/0342115 A1* | 11/2018 | Chen .................. G07C 5/008 |
| 2019/0188925 A1* | 6/2019 | Calvert .................. B60L 53/305 |
| 2020/0145342 A1* | 5/2020 | Olesen .................. H04L 47/365 |
| 2020/0145978 A1* | 5/2020 | Gulati .................. H04W 72/044 |
| 2020/0219335 A1* | 7/2020 | Gintz .................. G05D 1/0022 |
| 2020/0226852 A1 | 7/2020 | Lian et al. |
| 2021/0042014 A1 | 2/2021 | Marshall et al. |
| 2021/0065474 A1 | 3/2021 | Liu et al. |
| 2021/0065480 A1 | 3/2021 | Liu et al. |
| 2023/0252824 A1* | 8/2023 | Merg .................. G07C 5/008 701/29.4 |

\* cited by examiner

SYSTEMS AND METHODS FOR SENDING VEHICLE INFORMATION AND HEALTH DATA OVER A WIRELESS NETWORK

BACKGROUND

LoRa is a modulation technique that involves manipulating radio waves to encode information using a chirped (chirp-spread spectrum technology), multi-symbol format. LoRaWAN is a low-power, wide-area networking protocol using the LoRa modulation. LoRaWAN wirelessly connects devices and manages communication between end-node devices and network gateways. LoRaWAN is beneficial because it provides an affordable long-range, bi directional communication protocol with very low power consumption. Transmitting large amounts of data over this specific type of network, however, may provide a challenge given the constraints associated with LoRaWAN. For example, it may be impossible or impractical to transmit this type of data within a single packet over the LoRaWAN network. This may be because LoRaWAN networks are limited to the 900 MHz spectrum, and the amount of time that data transmissions may be performed over this spectrum is limited (LoRaWAN is a low bandwidth low data rate protocol).

Figure 1:
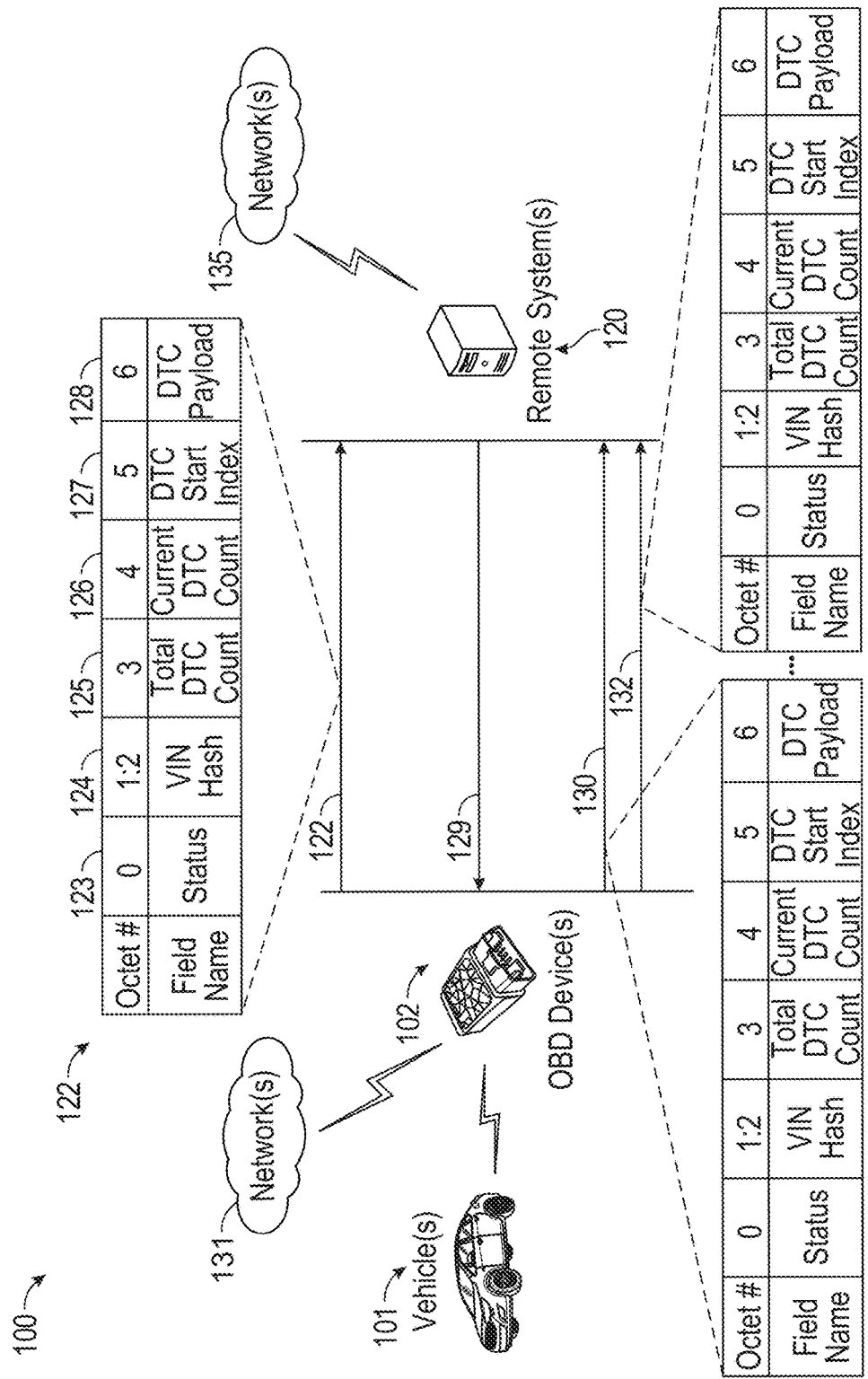
FIG. 1 is an example diagram for a use case for a remote asset detection system in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

This disclosure relates to, among other things, systems and methods for sending vehicle information and health data (as well as any other types of data) over a wireless network. Particularly, the systems and methods may provide improvements to the manner in which large data sets are sent over LoRaWAN networks (low-power wide-area networks).

In one or more embodiments, the systems and methods described herein may more particularly provide for more effective transmission of diagnostic troubleshooting codes (DTC) over LoRaWAN from an on-board diagnostic (OBD) device that is plugged into a vehicle (for example, into an OBD-II port of the vehicle) and/or wirelessly connected to the vehicle. Any number of such devices may be deployed within any number of vehicles for the purpose of asset tracking and vehicle health and/or condition monitoring (as one non-limiting example, vehicles within a fleet of vehicles may be tracked). A given device may read both standards-based (generic across different types of vehicles) and OEM-specific data from the vehicle. This monitoring may be performed for use with a number of different use cases. For example, the device may monitor the health of the vehicle's battery and may automatically enable certain vehicle services if the vehicle's battery is determined to be sufficient. The device may also capture any other types of data as well. It should be noted that these systems and methods described herein may also be applicable in any other context in which large data sets are sent over LoRaWAN as well, including data that is unrelated to OBD data obtained from a vehicle.

In one or more embodiments, a device may generally be implemented within a vehicle as follows. First, a device may be installed within a vehicle. Such installation may involve connecting the device to the OBD-II port of the vehicle. In some cases, the device may also be configured to obtain data from the vehicle wirelessly without having to be inserted into the OBD-II port. Once the device is installed within the vehicle, data gathering may be initiated. The data gathering processing may involve the device confirming that it is installed within a vehicle and/or obtaining identifying information associated with the vehicle, such as a vehicle identification number (VIN). The device may then initiate a data read process when the vehicle is cranked.

In one or more embodiments, the read process may begin with the device identifying if it has been installed in a new vehicle. That is, identifying if this is the first instance in which the device is connected to the particular vehicle rather than a situation where a device is connected to a vehicle, disconnected, and then connected again to the same vehicle at a later time. The device may initiate different types of actions based on the VIN of the vehicle and may also perform certain actions regardless of the VIN. As non-limiting examples, by default (regardless of the VIN), the device may obtain certain types of data, such as battery voltage, any existing malfunction indicator lamps (MILs), and/or warning indicator lamps (WILs) that are active in the vehicle (which may be caused by an active DTC associated with the vehicle). In some cases, there may be three specific types of code categories that may be read by the device: pending, stored, and permanent (however, any other types of code and/or other types of data may also be read by the device). A pending code may not necessarily trigger MIL or a WIL on the vehicle dashboard but may indicate that a vehicle system may be behaving abnormally. For example, if a particular sensor has an operating range of 75-90 degrees (with a range of 65-95 being an acceptable range), if the vehicle determines that the sensor is operating at 70 degrees, then a pending code may be produced. A stored code may indicate that the vehicle is experiencing an issue that requires user attention. Continuing the same example, if the sensor begins operating below the 65 degrees acceptable range, then a stored code may be produced. A permanent code may be a code that is not able to be cleared using a device, such as an OBD-II device. Such a code may only be cleared by the vehicle itself once the issue is resolved. Given this, three reads may be performed by the device to identify codes associated with these categories. However, the device may not necessarily be limited to these three reads, and may also obtain any other types of vehicle data as well.

In one or more embodiments, any data obtained by the devices may be transmitted to a remote system (such as a remote server, for example) or multiple remote systems for additional processing. Particularly, the data may be transmitted using a LoRaWAN network. Transmitting vehicle data over this specific type of network may provide a challenge given the sheer volume of data that is involved along with the constraints associated with LoRaWAN transmissions. For example, it may be impossible or impractical to transmit this type of data within a single packet over the LoRaWAN network. This may be because LoRaWAN networks are limited to the 900 MHz spectrum, and the amount of time that data transmissions may be performed over this spectrum is limited (LoRaWAN is a low bandwidth low data rate protocol). Given this, the amount of data that may be transmitted over LoRaWAN in the allotted time frame may depend on the rate at which the data is transmitted. A higher transmission rate may result in more data being transmitted within the same time frame. The systems and methods described herein address these constraints of LoRaWAN by a data set may be separated into individual segments and the segments may be transmitted individually.

In one or more embodiments, the improved data transfer associated with the systems and methods described herein may be performed as follows. First, the OBD device may perform one or more scans for data to be pulled from the vehicle (for example, scans for pending, stored, and/or permanent codes, as well as any other types of data). Once the desired data is obtained from the vehicle, the data may then be categorized. Individual packets or groups of packets may be used for individual categories of data. A first example category of data may include an indication as to whether a MIL or WIL is currently active. A second example category of data may include any pending codes. A third example category of data may include any stored codes. A fourth example category of data may include any permanent codes. These are just examples of categories and any other data categories may also be used.

In one or more embodiments, there may be a limit to the number of codes that may be included in a single packet (given the packet size constraints associated with LoRaWAN). For example, it may only be possible to include three separate codes (or any other number of codes) within a single packet. Thus, in scenarios where more than the maximum number of codes are obtained for a given category, a first packet may be transmitted with the maximum number of codes and an indication that additional codes will be transmitted in a subsequent packet. The remaining codes may then be transmitted in one or more subsequent packets, and the receiving device may anticipate the arrival of these subsequent packets.

In one or more embodiments, a data rate associated with the LoRaWAN transmissions may also be adaptive. For example, based on network conditions, more bandwidth may be available and thus more information may be added to a single packet or group of packets. However, if network conditions begin to worsen (for example, if more packets begin to drop), then the data rate may again be reduced.

In one or more embodiments, given that the data is separated into individual segments and transmitted through multiple packets, the device(s) receiving the transmissions may need to collect the data included in the packets and reconstruct the data into the original data. Specifically, the transmitted packets may include one or more flags that may indicate a particular vehicle that the packet is associated with, as well as a specific category of data the packet is associated with. For example, the packet may include the VIN of the vehicle. However, given the number of values included in a typical VIN, a compressed version of the VIN may be transmitted in any given packet. The compressed version may include a hash of the VIN that includes a sufficient subset of the VIN characters that are just unique enough to distinguish the compressed VIN from any other VINs associated with other vehicles. LoRaWAN may be characterized as a type of network where data loss may be more prevalent, so it may be important for the receiving device to understand what data is included and/or not included in a particular packet. Table 1 provides an example of a packet that may be transmitted, including examples of data that may be included within the packet.

TABLE 1

| Octet # | 0 | 1:2 | 3 | 4 | 5 | 6 . . . |
|---|---|---|---|---|---|---|
| Field Name | Status | VIN Hash | Total DTC Count | Current DTC Count | DTC Start Index | DTC Payload |

In one or more embodiments, data included within a packet may include, for example, a VIN hash, a reserved bit, an engine running bit, a MIL (Malfunction Indicator Lamp) bit, DTC information bits, and/or any other types of data. Different combinations of bit values may indicate, for example, no DTCs found (only VIN hash sent), an error reading DTC (only VIN hash sent), a valid DTC being present, a valid DTC being present and all DTCs found are in this message, a DTC type (for example, only one type may be present per message), such as a stored DTC, a pending DTC, and/or a permanent DTC. The bits may also indicate any other types of data as well.

VIN Hash may include a subset of the vehicle VIN (for example, if the VIN is 4Y1SL1234Z456789, then the subset may be 0x67,0x89). The VIN hash may also include any other number of digits of the VIN. Total DTC Count may include a total number of DTCs of DTC type found. Current DTC Count may include a number of DTCs of DTC type in the current message. DTC Start Index may include an index of the first DTC in the message. DTC Payload may include a list of 2-byte (and/or any other size) DTCS Current DTC count in number.

These example field values are merely exemplary and are not intended to be limiting in any way. For example, the specific bits described with respect to the status field may include any of the other information described as being associated with other bits, any other information may be associated with each bit, etc. Additionally, any other types of fields may be included and/or a packet may include any combination of the aforementioned types of fields. Furthermore, the information that is included in each packet, the information included in each field, and/or in each bit may vary with each packet or with some packets.

In one or more embodiments, processing of any packets received by a receiving device may be performed as follows. First, the receiving device may check the VIN of the vehicle.

To accomplish this, the receiving device may verify that the VIN Hash included within the packet corresponds to the last received VIN. If not, the message may be discarded, and any previously pending multi-packet message may be sent as is. Second, the receiving device may check the start of the new message. DTC messages may be variable in length and may be split into multiple packets. To detect if a received packet is the start of a new sequence of DTCs, the status byte may be set to a particular combination of bits (or a single bit value). Different combinations of bits may indicate a new single-packet message or a new multi-packet message.

If there is already a pending multi-packet DTC message waiting on more packets, the pending message may be sent to the receiving device as is. Third, the receiving device may obtain any DTCs. The packet may be parsed based on the status bits. A particular bit or combination of bits may indicate no DTCs. A particular bit or combination of bits may indicate an error condition and no DTC. A particular bit or combination of bits may indicate a Total DTC Count DTCs may be sent from a tracker. The current packet contains Current DTC Count DTCs. DTC Start Index may be used to keep track of which DTCs have been received and which DTCs are yet to be received from a tracker. A particular bit or combination of bits may indicate that all the identified DTCs are included within the message. These are merely examples of types of fields and information that may be included in such fields and is not intended to be limiting.

In one or more embodiments, error handling may also be performed. Devices may be moved from vehicle to vehicle and messages may be dropped. To accommodate for this, a number of error handling rules may be applicable. A first example error handling rule may involve timeout situations. For multi-packet messages, a timeout of a predetermined period of time (for example, five minutes or any other time) may be set. After this time period, all DTCs that have already been received by the device from the vehicle may be sent. Any multi-packet message received subsequently which does not begin a new message may be discarded. A second example error handling rule may involve missing messages. For single-packet messages, most DTC messages may carry zero or very few DTCs and may be transmitted in one packet, even at low data rates. In these cases, a counter may be used to detect missing packets. For multi-packet messages, at very low data rates, vehicles with many DTCs may require multiple packets to transmit all the DTCs. In addition to the counter, the Total DTC Count, Current DTC Count, and DTC Start Index (presented in Table 1) may also be used to account for DTCs received. If a subset of DTCs are missing, and a timeout occurs waiting for the missing DTCs, these octets can be used to inform the remote system of any missing DTCs.

In one or more embodiments, in addition to data transmissions from a device (for example, the OBD-II device) to a remote system, two-way communications may also be used. That is, instead of all reading logic (logic relating to how the device obtained specific types of information from the vehicle) being stored in the device, the remote system may send certain commands and memory addresses to the device so that the device understands how to obtain and process-specific information from the vehicle. The manner in which this information is obtained may vary by vehicle, so this information may not necessarily be stored on the device itself. The remote system may also provide any other types of commands and/or information to the device as well. For example, the remote system may indicate specific times at which data is desired to be obtained by the device from the vehicle.

In one or more embodiments, the remote system may obtain information about specific memory locations in which certain types of data may be obtained for different types of vehicles. For example, a first make of vehicle may store odometer information in one memory location and a different make of vehicle may store odometer information in a different memory location. Additionally, the manner in which the data is obtained may also be different. The remote system may store this information (for example, in a look-up table or in any other format) and/or may have access to such information from a third-party system. This information may be sent to the device at the vehicle so that the device may then know where within the vehicle memory to access the desired information. The device may also send requests to the remote system for such information as well. This information may also be sent through the LoRaWAN network in a similar manner in which data is transmitted from the device to the remote system. For example, a VIN message transmitted from the device to the system may trigger this. Then, a service in the platform may request the vehicle-specific data via an API by passing the VIN information to another external service (for example). Specific information like odometer readings, seatbelt status, tire pressure, etc. may be requested. In some cases, generic requests to the external service may be made requesting all known information for the specific VIN.

In one or more embodiments, one or more vehicle services and/or certain operations performed by the device itself may be enabled, disabled, and/or adjusted based on the data that is obtained from the vehicle. As one non-limiting example, the operation of the device may be limited based on data obtained relating to the vehicle's battery level. If the battery level is below a particular threshold, then the amount of time the device is awake and/or reading data from the vehicle may be reduced to reduce the amount of power the device draws from the vehicle. That is, the frequency at which data is received by the device may be adjusted based on the battery level of the vehicle.

Turning to more specific operations of the OBD devices themselves, the devices may provide remote and continuous asset verification without having to physically send anyone to the lot while obtaining an accurate real-time read of a vehicle's VIN and location. A rules-based alert system may notify an administrator when to intervene (e.g., when an on-board diagnostic tool is unplugged from the vehicle) and when to monitor an asset more closely without wasting resources or bothering the personnel responsible for the car (e.g., a car left the lot but headed to a typical location for that lot).

The remote asset detection system may include a robust system interface and dashboards showing information to different users of the system, the use of on-board diagnostic (OBD) tools, and data analysis which may provide insight into a vehicle dealer's complete portfolio, dealership lot sale analytics (e.g., car trend report), dealership risk score based on OBD driving and routing data of the vehicles of the dealership, and the like. The OBD tool may include tamper-proof hardware, a backup battery, a GPS, an antenna, an accelerometer, and/or a pass-through port. In some embodiments, the OBD tool may be a tool that locks into an OBD port of a vehicle. The OBD tool may lock into the OBD port and prevent any other mechanism or tool to access the OBD port of the vehicle. The mechanical locking mechanism of the OBD tool may prevent the OBD tool from being removed from the OBD port of the vehicle. In some embodiments, the OBD tool may be a tool that may be inserted into the OBD port of the vehicle and may include a pass-through port. The pass-through port may allow personnel to connect their own OBD readers while permitting an administrator of the system to limit access to certain types of data. The OBD tool may also be equipped with one or more mechanical locking mechanisms that prevent the removal of the OBD tool from the OBD port of the vehicle.

In some embodiments, the backup battery may enable the OBD tool to function even if it is not connected to a vehicle. The backup battery may thus also allow the OBD tool to function if power is not able to be drawn from the vehicle. This enables the OBD tool to send signals to the remote asset detection system indicating that the tool has been disconnected or tampered with. The OBD tool may send periodic or heartbeat messages, which may indicate a location of the tool.

In some embodiments, the OBD tools, which may also be referred to as OBD trackers, may be installed on multiple vehicles. Data collected and generated by the OBD tools may be transmitted to a platform of the remote asset detection system. In some embodiments, the car data may be shared with the dealership, such as through access to a dealership application. In some embodiments, data may be received from or transmitted to the platform from other systems, such as financial institutions. Examples of such communications may include management alerts via an email, text, or an application programming interface (API), for example.

In some embodiments, different communication protocols may be used by the OBD tool. Examples of the different protocols may include, but are not limited to, SAE J1850 PWM, SAE J1850 VPW, ISO 9141-2, ISO 14230 KWP2000, or ISO 15765 CAN. In some embodiments, OBD-II communication protocol may have different modes, which may identify everything from powertrain information to emissions and vehicle identification information, among others. Additionally, each vehicle manufacturer may have special additional codes that can be identified.

Diagnostic trouble codes (DTCs) are defined by SAE, and the codes can be either generic or unique to the vehicle manufacturer. However, the codes all share the same five-alphanumeric format which allows for identification.

An OBD sensor may decode certain messages such as the VIN, the car battery voltage and special error code checking. The OBD tool may allow for a configurable set of parameters allowing for a default set of message types to be checked at a specific cadence. The OBD tool may be able to be set to a second resolution if needed for checking RPM, speed, or temperatures. In some embodiments, thresholds to alarm the different user roles of the remote asset detection system may be set at specific levels for the different parameters. For example, messages could be for fuel below a certain level or a speed higher than the max speed allowed on the lot. If no alarm is specified, then the OBD tool may transmit the information to the backend to be decoded and analyzed. In some embodiments, the OBD tool may have a set of DTC scanning codes that match all manufacturers and will scan every time a vehicle is turned on, then have a configurable scan section to search for DTC codes that are nonstandard but could be configured to search for based on a network message. For example, if there is a specific code that only applies to a 2014 Hyundai Sonata, when an OBD tool is associated with a 2014 Sonata, it may be instructed to look for this DTC in addition to the standard codes.

An example data flow may include an OBD sensor of the OBD tool reading codes from the OBD as it is first inserted into the OBD port of the vehicle and during specific events. The sensors may parse the data obtained from the vehicle and pass the data, which may include DTC and parameter ID (PID) data, back to the backend or platform of the remote asset detection system. The backend or OBD tool may parse the unique codes and display the data to the different user roles of the system in different user interfaces.

In some embodiments, the OBD tool may have several security considerations. For example, the OBD tool may include a physical locking mechanism, opened via a specialized key. This lock may be constructed of high-strength stainless steel and will not detach from the OBD port without the key or without causing significant damage to the vehicle. The OBD tool may include a pass-through port (which may be referred to as an OBD II port) that can potentially allow for restricted remote access. All signal and power lines may be routed directly through the printed circuit board (PCB) board of the OBD tool, and hardware-based switches may be implemented to disable access to the OBD port through the pass-through port, if necessary. In some embodiments, access to some data through the pass-through port may be disabled remotely. In some embodiments, the port can only be accessed at specific locations or times for inspection. In some embodiments, special algorithms may be employed at the embedded level to ensure vehicle validity and may report if the mechanical locking mechanism has been defeated for even the shortest amount of time. These algorithms may check a number of physical and communication vectors to compare an actual vehicle to a potentially defeated device or emulator. The strength of the algorithms may increase as the OBD tool is deployed because it will be able to adapt based on actual patterns encountered in the field.

In some embodiments, rolling key encryption may be built in at the communications module level to prevent spoofing. In some embodiments, device payload masking and key pair encryption methods may add another element of security to the OBD tool.

The use of emulators or unauthorized vehicle engine control unit (ECU) access would require physical damage to the vehicle, which could be detected remotely in many cases.

Although the examples and descriptions herein are directed to cars, the systems and methods herein may be used with other assets, such as boats, construction vehicles, motorcycles, self-driving vehicles, recreational vehicles, airplanes, helicopters, autonomous vehicles, drones, unmanned aerial vehicles, and the like.

Turning to the figures, FIG. 1 is an example diagram for a use case 100 for a remote asset detection system in accordance with one or more embodiments of the disclosure.

In one or more embodiments, the use case 100 may illustrate communications that may be exchanged between one or more vehicle(s) 101, one or more device(s) 102, and/or one or more remote system(s) 120.

Figure 12:
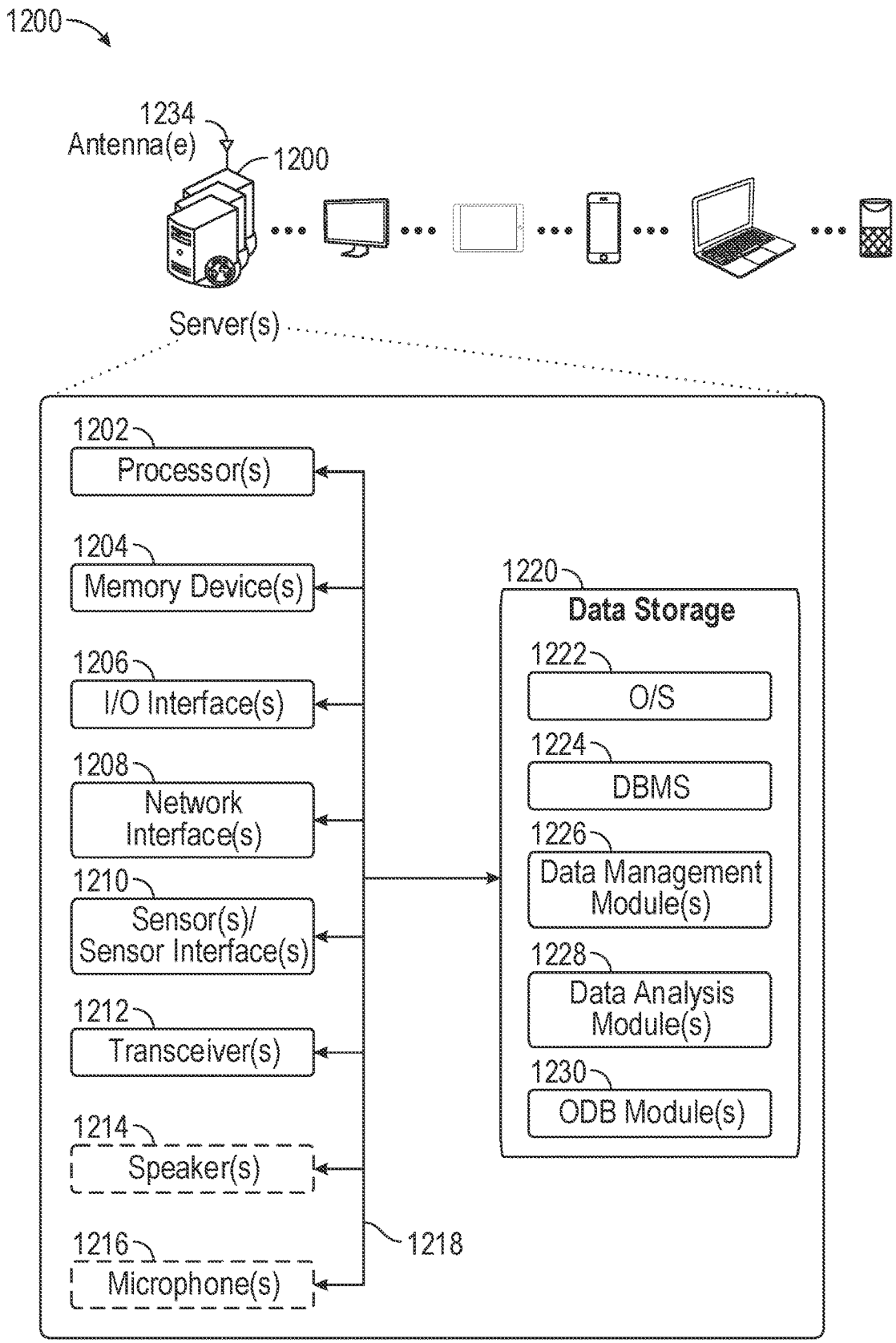
FIG. 12 is an example diagram that schematically illustrates an example architecture of a server of the remote asset detection system in accordance with one or more embodiments of the disclosure.

In one or more embodiments, the one or more vehicle(s) 101, one or more device(s) 102 may include one or more computer systems similar to that of the functional diagram of FIG. 12, for example.

In one or more embodiments, the one or more vehicle(s) 101 may include any type of vehicle (for example, electric vehicle, hybrid vehicle, internal combustion engine vehicle, autonomous or semiautonomous vehicle, etc.).

In one or more embodiments, a vehicle 101 may include any number of different types of internal networks through which data may be transmitted between various vehicle components. For example, a vehicle 101 may include a CAN bus. The CAN bus may be a network internal to the vehicle 102 that may allow various devices and microcontrollers within the vehicle 101 to be connected and to communicate using a standardized CAN protocol (which may be defined in the CAN specification (ISO 11898)). For example, the CAN bus may be used to transfer data between one or more Electronic Control Units (ECUs) of the vehicle 101. An ECU may be a computing element within the vehicle 101 that may be responsible for managing operations of one or more particular features of the vehicle 101. For example, one ECU may control and monitor various accessories in a door of the vehicle 101. A second ECU may control features like automatic mirror adjustment. A third ECU may provide engine management functionality. The CAN bus may also be used to transmit data between any other types of devices other than ECUs as well. In one or more embodiments, the vehicle 101 may also include any other different types of internal networks as well. For example, ECUs (or other vehicle components) may communicate through Ethernet, wireless communications, and/or any other types of networks beyond a CAN bus.

In one or more embodiments, the one or more device(s) 102 may be OBD devices that may connect with an OBD-II port of a vehicle 101 to obtain data stored and/or otherwise available within the vehicle 101. For example, the device 102 may plug into an OBD-II port of the vehicle and/or may wirelessly communicate with the vehicle 101. In one or more embodiments, a device 102 may decode certain messages such as the VIN, the car battery voltage, and special error code checking. The device 102 may allow for a configurable set of parameters allowing for a default set of message types to be checked at a specific cadence. The device 102 may be able to be set to a second resolution if needed for checking RPM, speed, or temperatures. In some embodiments, thresholds to alarm the different user roles of the remote asset detection system may be set at specific levels for the different parameters. For example, messages could be for fuel below a certain level or a speed higher than the max speed allowed on the lot. If no alarm is specified, then the device 102 may transmit the information to the backend to be decoded and analyzed. In some embodiments, the device 102 may have a set of DTC scanning codes that match all manufacturers and will scan every time a vehicle is turned on, then have a configurable scan section to search for DTC codes that are non standard but could be configured to search for based on a network message. For example, if there is a specific code that only applies to a 2014 Hyundai Sonata, when a device 102 is associated to a 2014 Sonata, it may be instructed to look for this DTC in addition to the standard codes. However, the one or more device(s) 102 may also be any other types of devices that may be capable of obtaining data from the vehicle as well. Such diagnostic information may be obtained using established OBD parameter IDs (PIDs), which may be codes that are associated with various vehicle systems. For example, one specific PID may be used to obtain information about a throttle position of the vehicle, and another PID may be used to obtain information about the output of a specific oxygen sensor within the vehicle. Vehicles may have an OBD port in which a user may insert the diagnostics tool 110 to allow the user to capture this diagnostics data from the OBD system of the vehicle and view this data externally. Additionally, it is standard for vehicles to implement OBD-II through a CAN bus of a vehicle (for example, CAN bus 108 of vehicle 102) based on ISO 15765-4.

In one or more embodiments, the one or more remote system(s) 120 may receive and/or process any of the data received from the one or more device(s) 102. That is the one or more remote system(s) 120 may receive any data obtained with respect to any of the one or more vehicle(s) 101, such as battery charge levels, current speed, current location, any active DTCs, and/or any other types of data.

Additionally, in one or more embodiments, two-way communications may also be used. For example, in some cases, the one or more remote system(s) 120 may request that the one or more device(s) 102 obtain specific types of data from any of the one or more vehicle(s) 101. For example, it may be determined that a particular vehicle has an active DTC code indicative of a faulty sensor. In this scenario, a remote system 120 may send a request to a device 102 associated with that vehicle 101 to obtain additional data that may allow the remote system 120 to analyze potential causes of the active DTC. As another example, instead of all reading logic (logic relating to how the device obtained specific types of information from the vehicle) being stored in a device 102, a remote system 120 may send certain commands and memory addresses to the device so that the device 102 understands how to obtain and process-specific information from the vehicle 101. The manner in which this information is obtained may vary by vehicle, so this information may not necessarily be stored on the device itself. The remote system 120 may also provide any other types of commands and/or information to the device as well. For example, the remote system 120 may indicate specific times at which data is desired to be obtained by the device 102 from the vehicle 101.

Any of the one or more vehicle(s) 101, one or more device(s) 102, and/or one or more remote system(s) 120 may be configured to communicate with each other via one or more communications networks 131 and/or 135 wirelessly. In one or more embodiments, the one or more device(s) 102 may be configured to communicate with the one or more remote system(s) 120 via a LoRaWAN network (for example, networks 131 or 135). Additionally, the one or more devices 102 may be configured to request and or receive data from the one or more vehicles 101 through a wired or wireless connection. Particularly, the one or more devices 102 may be OBD devices that may connect to an OBD-II port of a vehicle 101. However, data may be communicated between the one or more vehicle(s) 101 and the one or more device(s) 102 using any other types of communications. However, any of the communications networks 131 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 131 and/or 135 may have any suitable communication range associated therewith and may include, for example, global networks (e.g., the Internet), metropolitan area networks (MANs), wide area networks (WANs), local area networks (LANs), or personal area networks (PANs).

In some embodiments, and with reference to FIG. 1, examples of operations performed by the one or more vehicle(s) 101, one or more device(s) 102, and/or the remote system(s) 120 may include the following. First, a device 102 may perform one or more scans for data to be obtained from a vehicle 101 (for example, scans for pending, stored, and/or permanent codes, as well as any other types of data) that the device 102 is associated with. For example, the device 102 may be plugged into an OBD-II port of the vehicle 101 and/or may be in wireless communication with the vehicle 101. Once the desired data is obtained from the vehicle 101, the data may then be categorized. Individual packets or groups of packets may be used for individual categories of data. A first example category of data may include an indication as to whether a MIL or WIL is currently active. A second example category of data may include any pending codes. A third example category of data may include any stored codes. A fourth example category of data may include any permanent codes. These are just examples of categories and any other data categories may also be used.

In one or more embodiments, any data obtained by the devices may be transmitted to a remote system 120 for additional processing through a first message 122 (for example a data packet). Particularly, the data may be transmitted using a LoRaWAN network (for example, any of networks 131 and/or 135).

In one or more embodiments, there may be a limit to the number of codes that may be included in a single packet (given the packet size constraints associated with LoRaWAN). For example, it may only be possible to include three separate codes within a single packet. Thus, in scenarios where more than the maximum number of codes are obtained for a given category, a first packet may be transmitted with the maximum number of codes and an indication that additional codes will be transmitted in a subsequent packet. The remaining codes may then be transmitted in one or more subsequent packets, and the receiving device may anticipate the arrival of these subsequent packets. This may be illustrated through the third message 130 and the fourth message 132 that are transmitted from the device 102 to the remote system 120.

In one or more embodiments, the first message 122 may include any number of different fields. For example, the first message 122 may include a first field 123 that may include status information. The first message 122 may also include a second field 124 that may include a subset of a VIN associated with the vehicle 101. The first message 122 may also include a third field 125 that may indicate a total number of DTCs associated with the first category of data. The first message 122 may also include a fourth field 126 that may indicate a number of DTCs included within the first message. The first message 122 may also include a fifth field 127 that may indicate an index of a first DTC within the first message 122. Descriptions of example information that may be included in each of these fields are provided above. The first message 122 may also include any other types of fields and/or any combination of fields illustrated within the first message 122 as well. That is, the first message 122 illustrated in the figure is not intended to be limiting. The first message 122 may also include a sixth field 128 that may be a DTC payload.

In one or more embodiments, in addition to data transmissions from the device 102 to the remote system 120, two-way communications may also be used (for example, as shown by the second message 129). That is, instead of all reading logic (logic relating to how the device obtained specific types of information from the vehicle) being stored in the device 102, the remote system 120 may send certain commands and memory addresses to the device so that the device 102 understands how to obtain and process-specific information from the vehicle 101. The manner in which this information is obtained may vary by vehicle 101, so this information may not necessarily be stored on the device 102 itself. The remote system 120 may also provide any other types of commands and/or information to the device 102 as well. For example, the remote system 120 may indicate specific times at which data is desired to be obtained by the device 102 from the vehicle 101.

While the above example makes reference to "a device 102," "a vehicle 101," and "a remote system 120," similar operations may be applied to any number of devices 102, vehicles 101, and/or remote systems 120 as well.

It is understood that the above descriptions are for purposes of illustration and are not meant to be limiting. That is, the above descriptions may provide high-level examples of some of the operations performed by the one or more vehicle(s) 101, the one or more device(s) 102, and/or the remote system(s) 120, but may not include all operations that may be performed.

Figure 2:
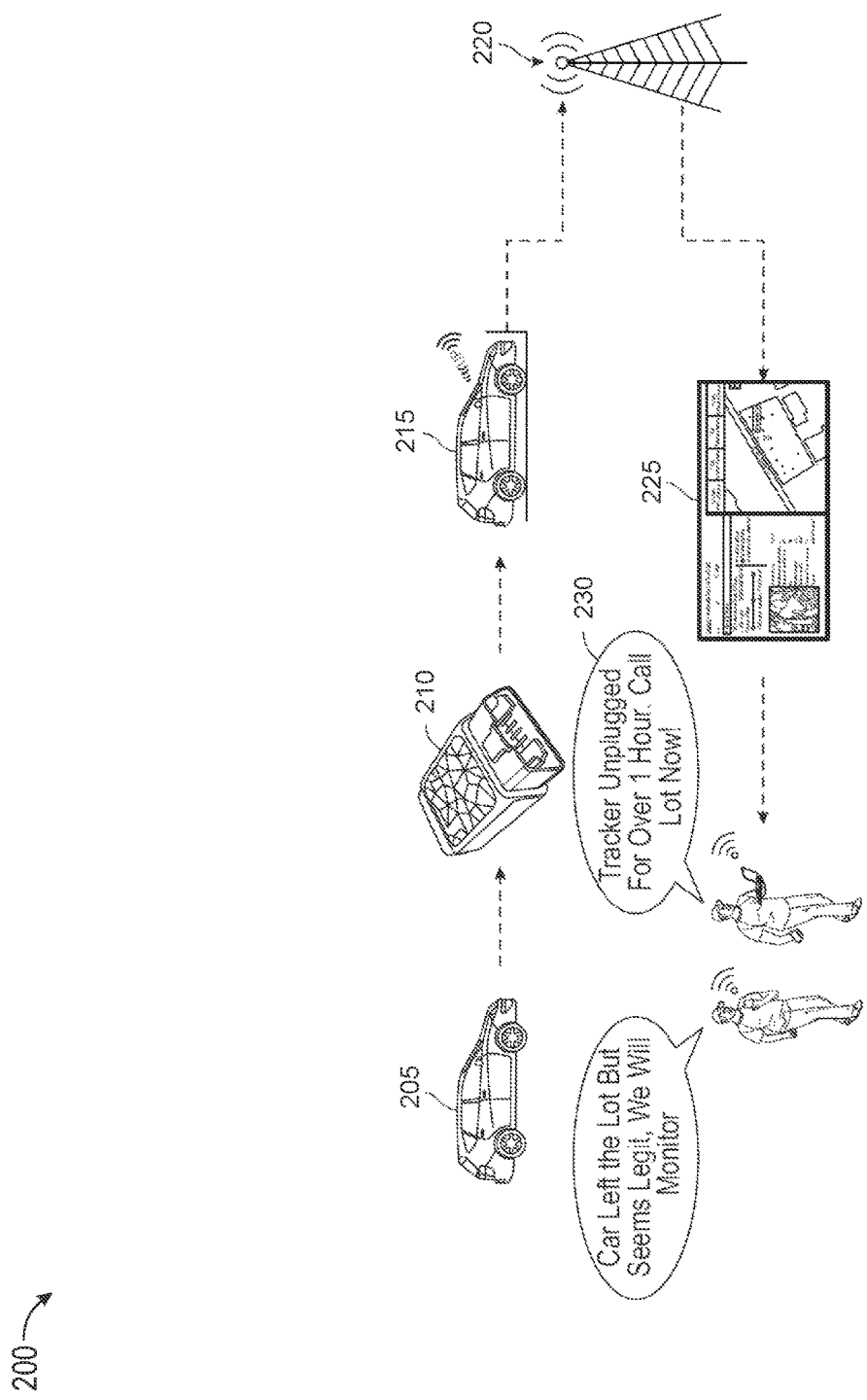
FIG. 2 is an example diagram for a use case for a remote asset detection system in accordance with one or more embodiments of the disclosure.

FIG. 2 depicts an example remote asset detection platform 200 for remote asset detection in accordance with one or more embodiments of the disclosure. In one example embodiment, a financial institution may finance a vehicle 205 and notify the remote asset detection platform 200, for example, via an API. For example, an OBD tool 210 may be installed on the vehicle 205. At operation 215, the OBD tool 210 may be activated in response to key events (e.g., insertion of the OBD tool, car movement, tampering with or removal of the OBD tool, etc.). The OBD tool 210 may transmit OBD codes, GPS, VIN number, and/or additional information. At operation 220, the data from the OBD tool 210 may be transmitted over a network and stored. The data from the OBD tool may be analyzed, and insights from the data may be presented through one or more platform interfaces 225. At operation 230, the financial institution may be notified of certain events based on predetermined rules.

The above-described embodiments are merely illustrative and not exhaustive and are not intended to be limiting in any way. Accordingly, variations, modifications, and equivalents of the embodiments disclosed herein are also within the scope of this disclosure.

Figure 3:
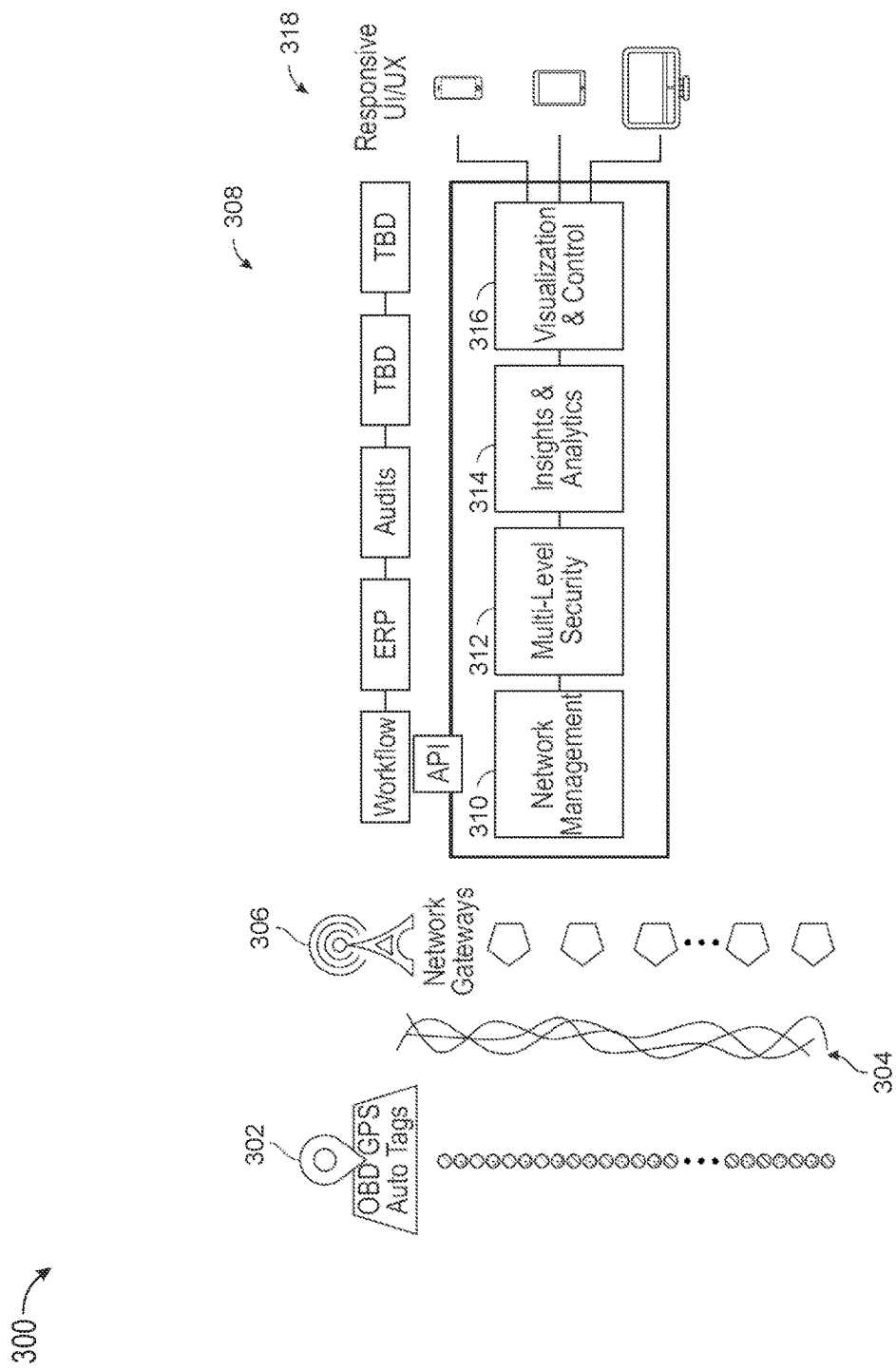
FIG. 3 is an example diagram for components of a remote asset detection system in accordance with one or more examples of the disclosure.

FIG. 3 depicts an example diagram for components of a remote asset detection system 300 in accordance with one or more example embodiments of the disclosure. In some embodiments, the OBD tools 302 may obtain data from the vehicle or via one or more components of the tools (e.g., GPS, accelerometer, etc.) and may transmit 304 the data to one or more network gateways 306. The data may be provided to a remote asset detection platform 308, where the data will be translated and analyzed by different components, such as the network management 310, multilevel security 312, insights and analytics 314, and visualization and control components 316. The data may then be made available through interactive interfaces 318 that may be presented on different types of devices, such as smartphones, tablets, laptops, or other computing devices.

Figure 4:
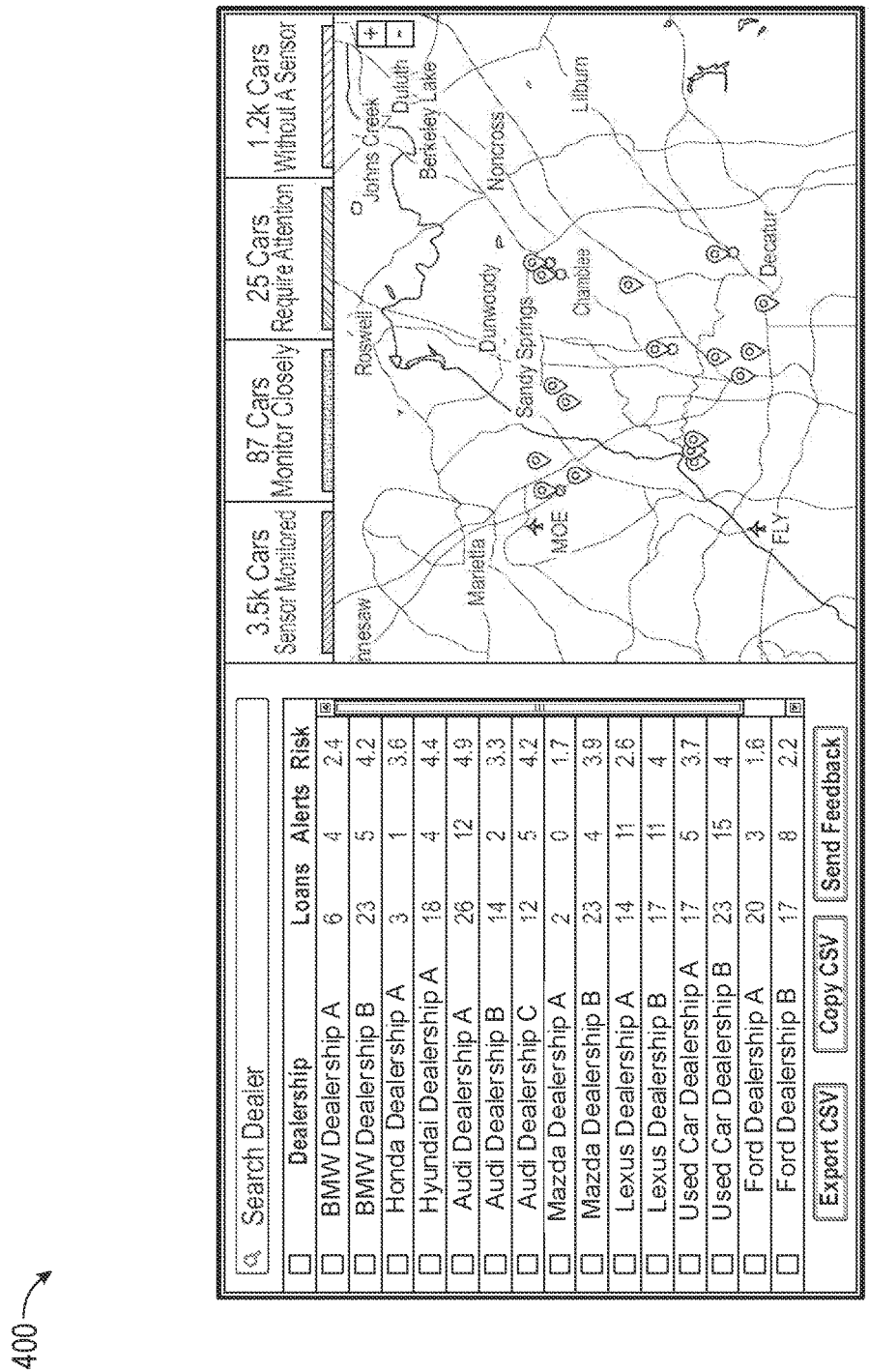
FIGS. 4-6 are diagrams depicting example user interfaces for a remote asset detection system in accordance with one or more embodiments of the disclosure.

FIG. 4 is a diagram that depicts example user interfaces 400 for a remote asset detection system in accordance with one or more embodiments of the disclosure. The platform of the remote asset detection system may use the data obtained from the OBD tools and other sources to generate a user interface that may be used to easily zero in on assets that require attention. For example, the user interface 400 may include maps and/or itemized data.

Figure 5:
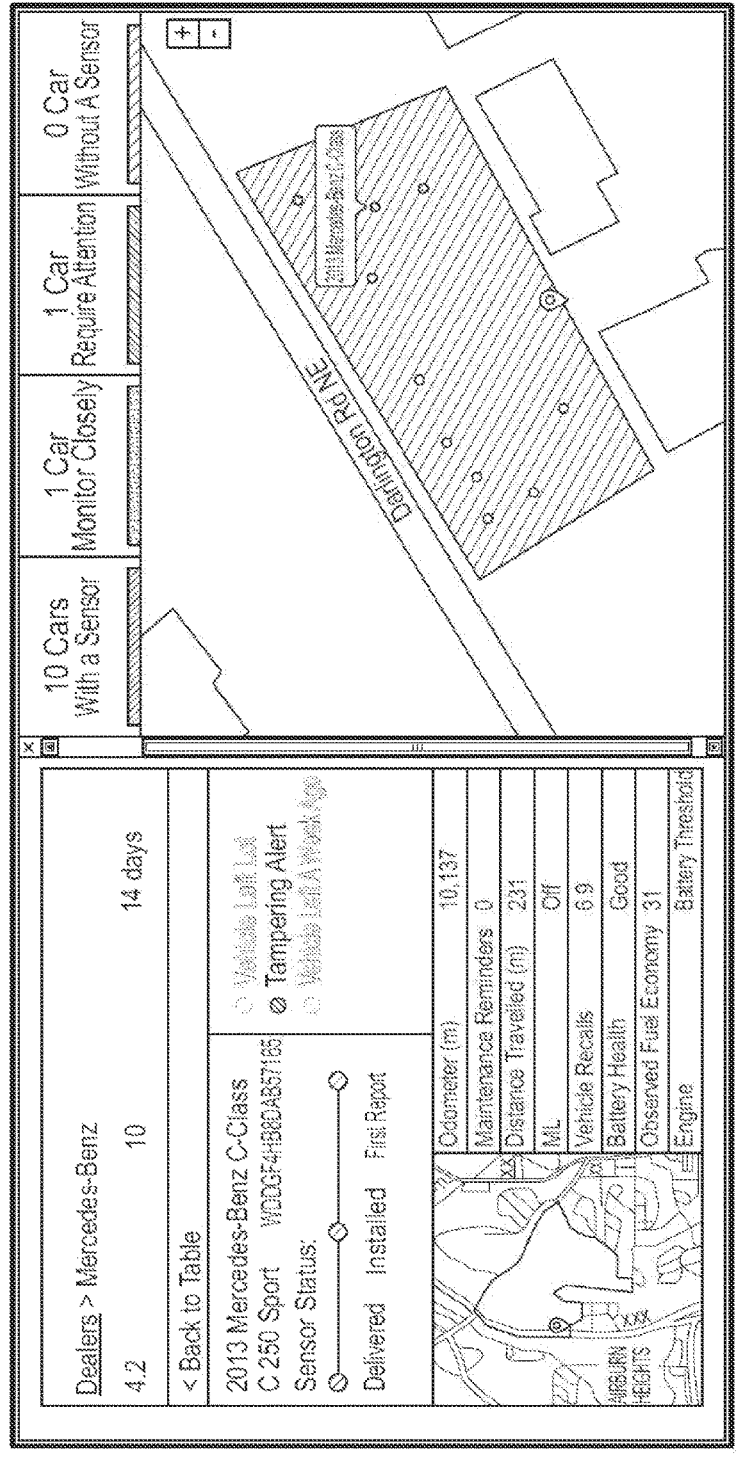

FIG. 5 is a diagram that depicts example user interfaces 500 for a remote asset detection system in accordance with one or more embodiments of the disclosure. The platform of the remote asset detection system may use the data obtained from the OBD tools and other sources to generate an interface that shows the exact location of a vehicle, current issues, and the history of the vehicle since being associated with a particular lot or location.

Figure 6:
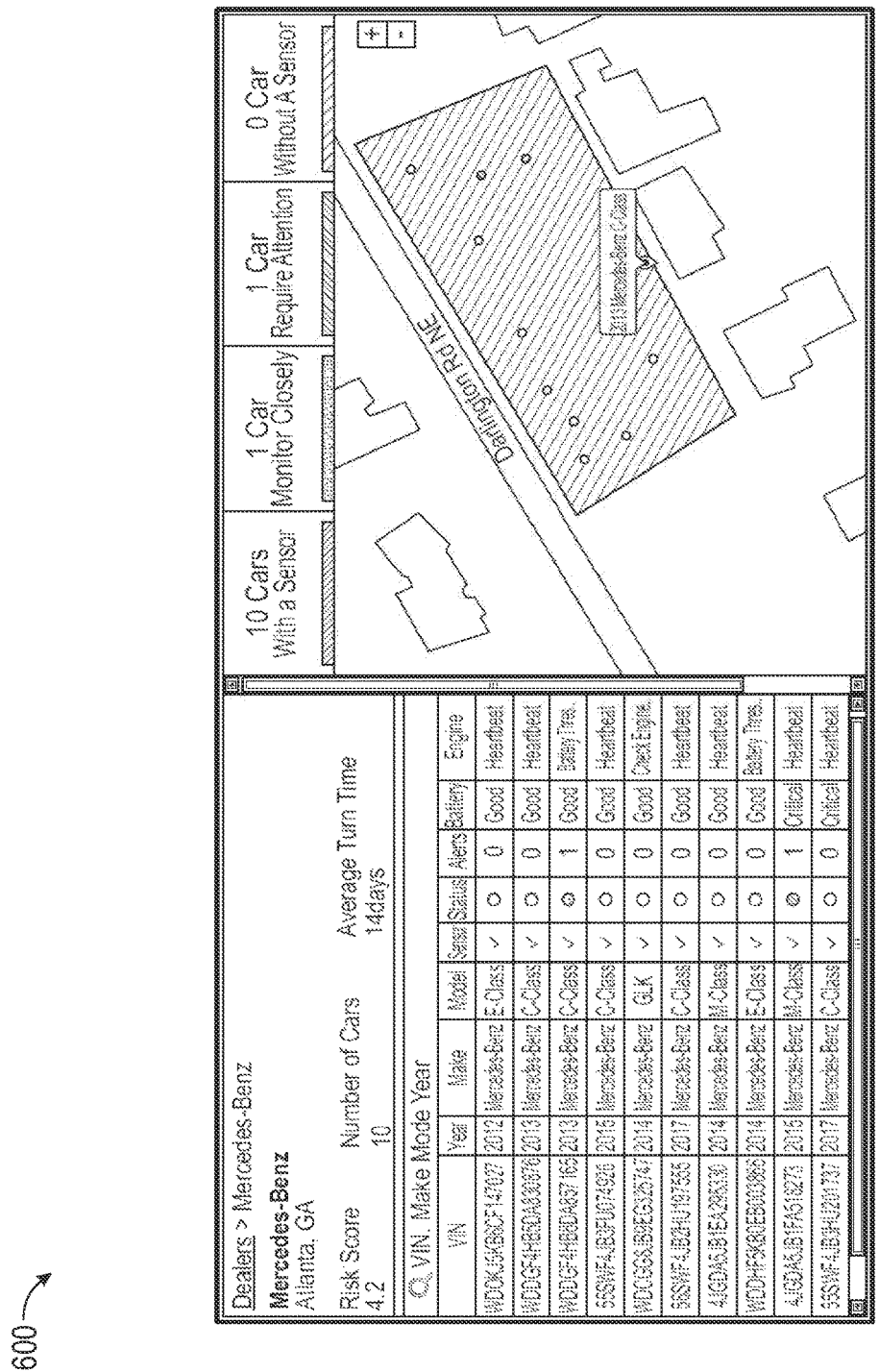

FIG. 6 is a diagram that depicts example user interfaces 600 for a remote asset detection system in accordance with one or more embodiments of the disclosure. The platform of the remote asset detection system may use the data obtained from the OBD tools and other sources to generate an interface that shows a risk score determined by an analytics engine using the data from the OBD tools and other sources and identifies high-risk assets.

Figure 7:
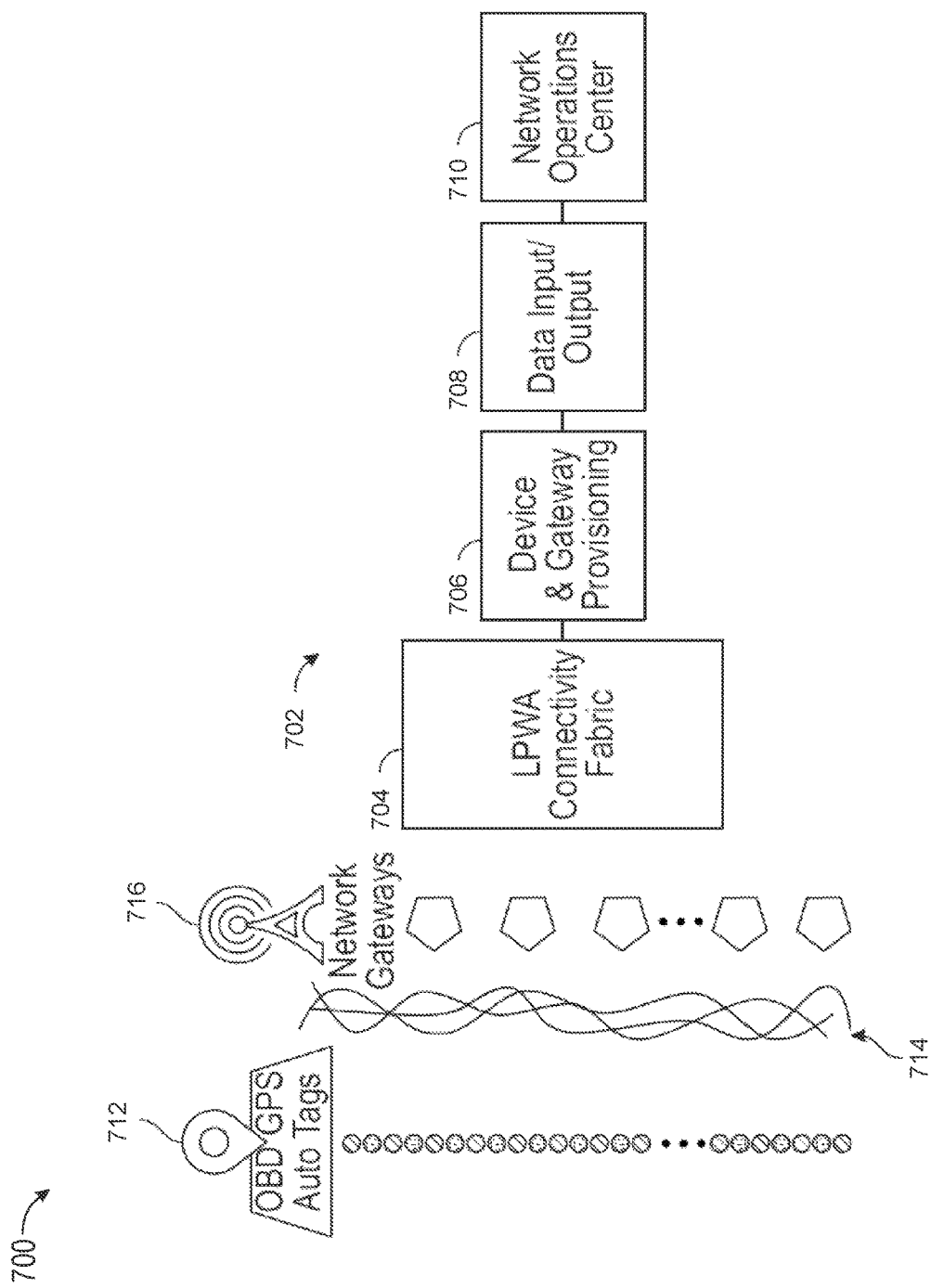
FIGS. 7-10 are example diagrams for components of a remote asset detection system in accordance with one or more examples of the disclosure.

FIG. 7 is an example diagram for components of a remote asset detection system 700 in accordance with one or more example embodiments of the disclosure. In some embodiments, the OBD tools 712 may obtain data from the vehicle or via one or more components of the tools (e.g., GPS, accelerometer, etc.) and may transmit 714 the data to one or more network gateways 716. The data may be provided to network management components 702 that include an LPWA connectivity fabric 704, device and gateway provisioning 706, data input/output 708, and a network operations center 710. The network management of the remote asset detection system 700 may provide carrier-grade quality-of-service (QoS) guarantees, a highly scalable LPWA network server, and network state monitoring with alarms, notifications, and logs. Radio planning capabilities for optimal network coverage may also be provided. In some embodiments, over-the-air firmware upgrades and remote device maintenance may be available for the OBD tools.

Figure 8:
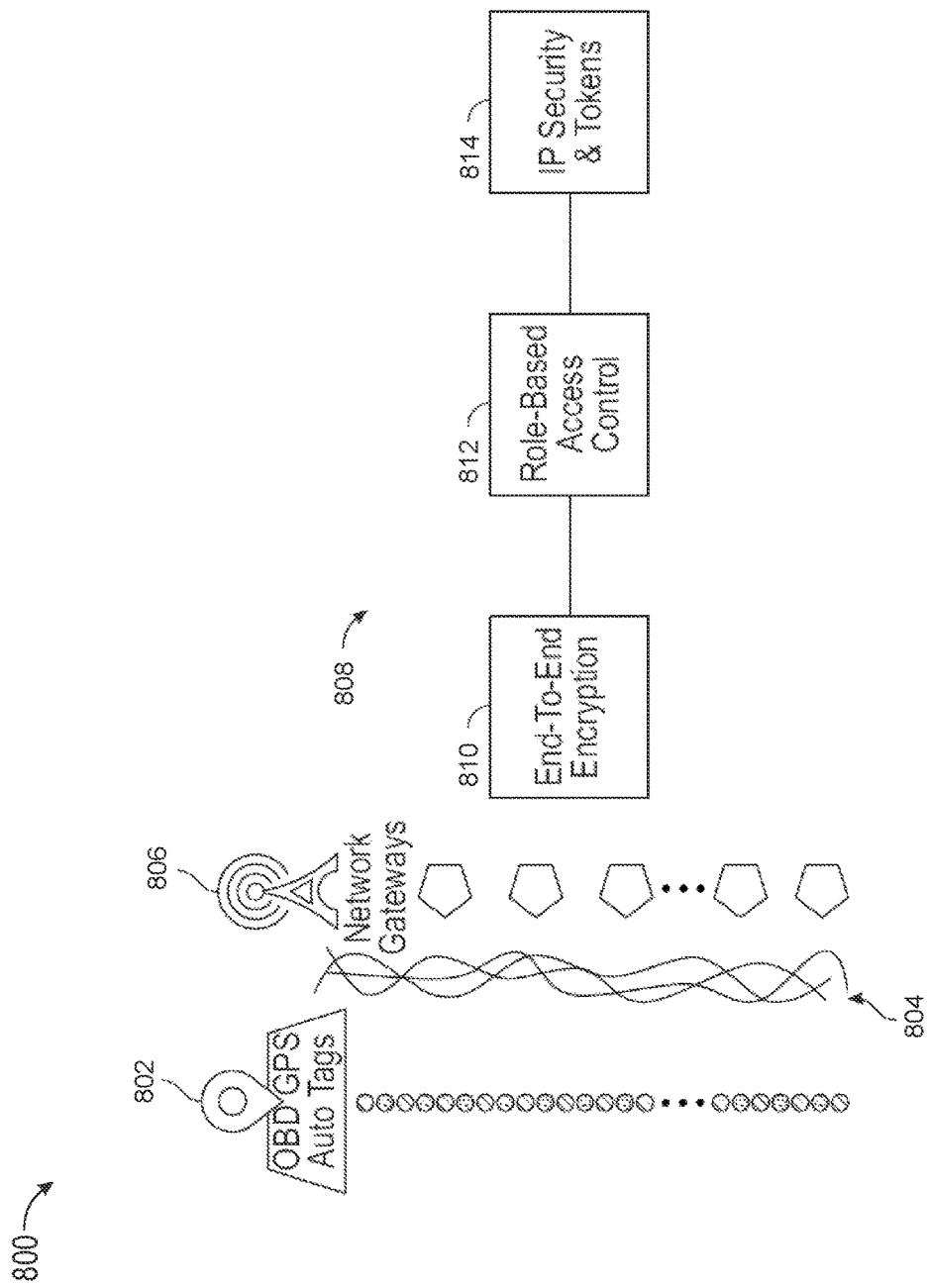

FIG. 8 is an example diagram for components of a remote asset detection system 800 in accordance with one or more example embodiments of the disclosure. In some embodiments, the OBD tools 802 may obtain data from the vehicle or via one or more components of the tools (e.g., GPS, accelerometer, etc.) and may transmit 804 the data to one or more network gateways 806. The data may be provided to the multilevel security components 808 for the remote asset detection system, such as end-to-end encryption 810, role-based access control 812, and IP security and tokens 814. In some embodiments, AES-128 bit packet decryption (uplink) and encryption (downlink) may be provided. Device state maintenance with sequence numbers and session keys may be handled by the multilevel security components 808. HTTPS IP connectivity with secure tokens and fine-grained role-based access control, fully configurable at the application level, may be provided.

Figure 9:
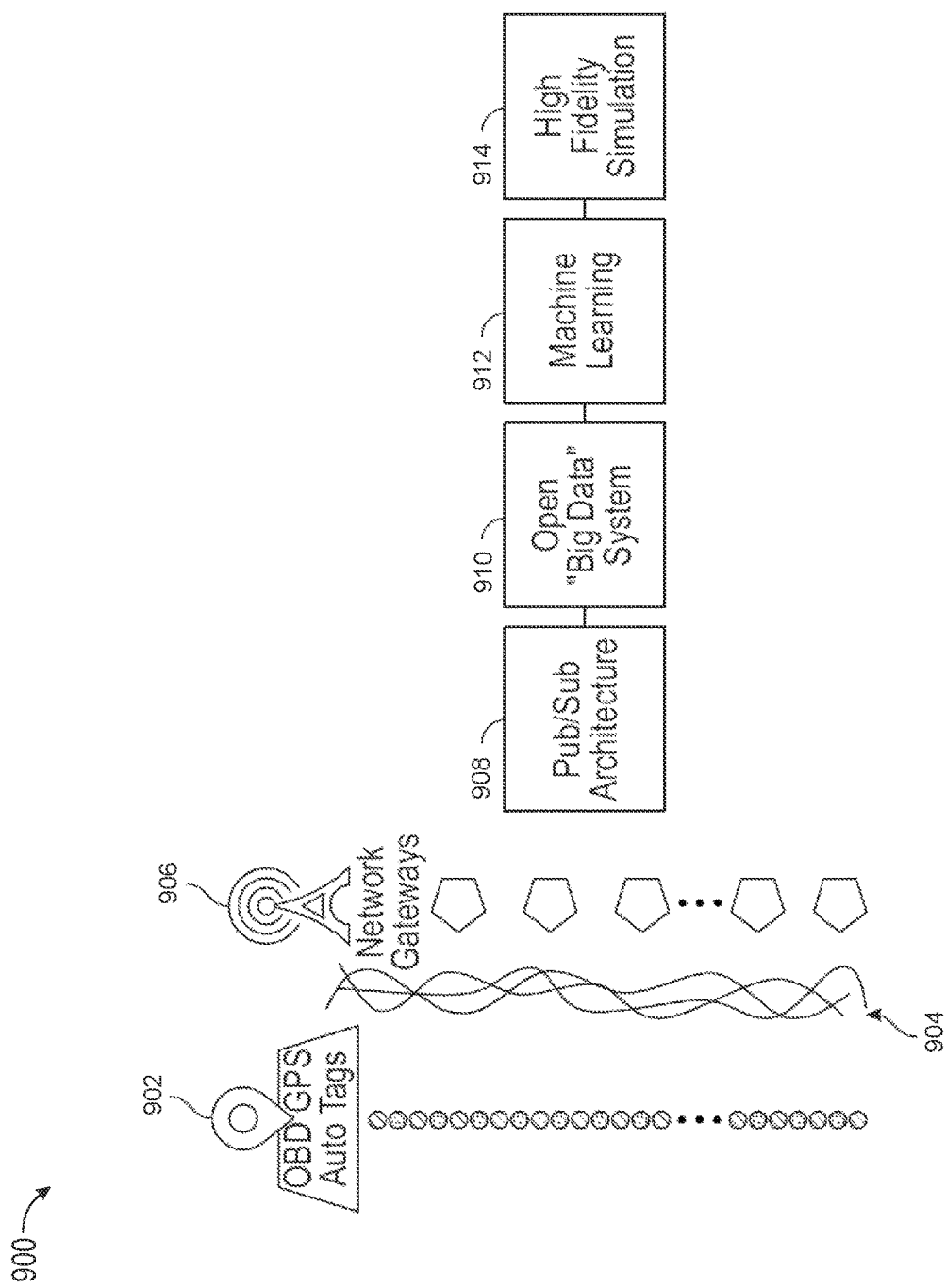

FIG. 9 is an example diagram for components of a remote asset detection system 900 in accordance with one or more example embodiments of the disclosure. In some embodiments, the OBD tools 902 may obtain data from the vehicle or via one or more components of the tools (e.g., GPS, accelerometer, etc.) and may transmit 904 the data to one or more network gateways 906. The data may be provided to insights and analytics components for the remote asset detection system, which may include pub/sub architecture 908, open "big data" system 910, machine learning 912, and high-fidelity simulation 914. In some embodiments, the insights and analytics components may use a virtual machine and container-based system and architecture. An open, API-based system with built-in support for UDP, MQTT, HTTP, and AQMP protocols may be implemented. A big-data architecture comprised of SQL, noSQL, and time-series databases with unlimited storage may be utilized. Predictive analytics and machine learning (e.g., IBM Watson analytics and Google TensorFlow) may also provide business insights. End-to-end simulation for performance modeling, stress testing, and user training may be provided.

Figure 10:
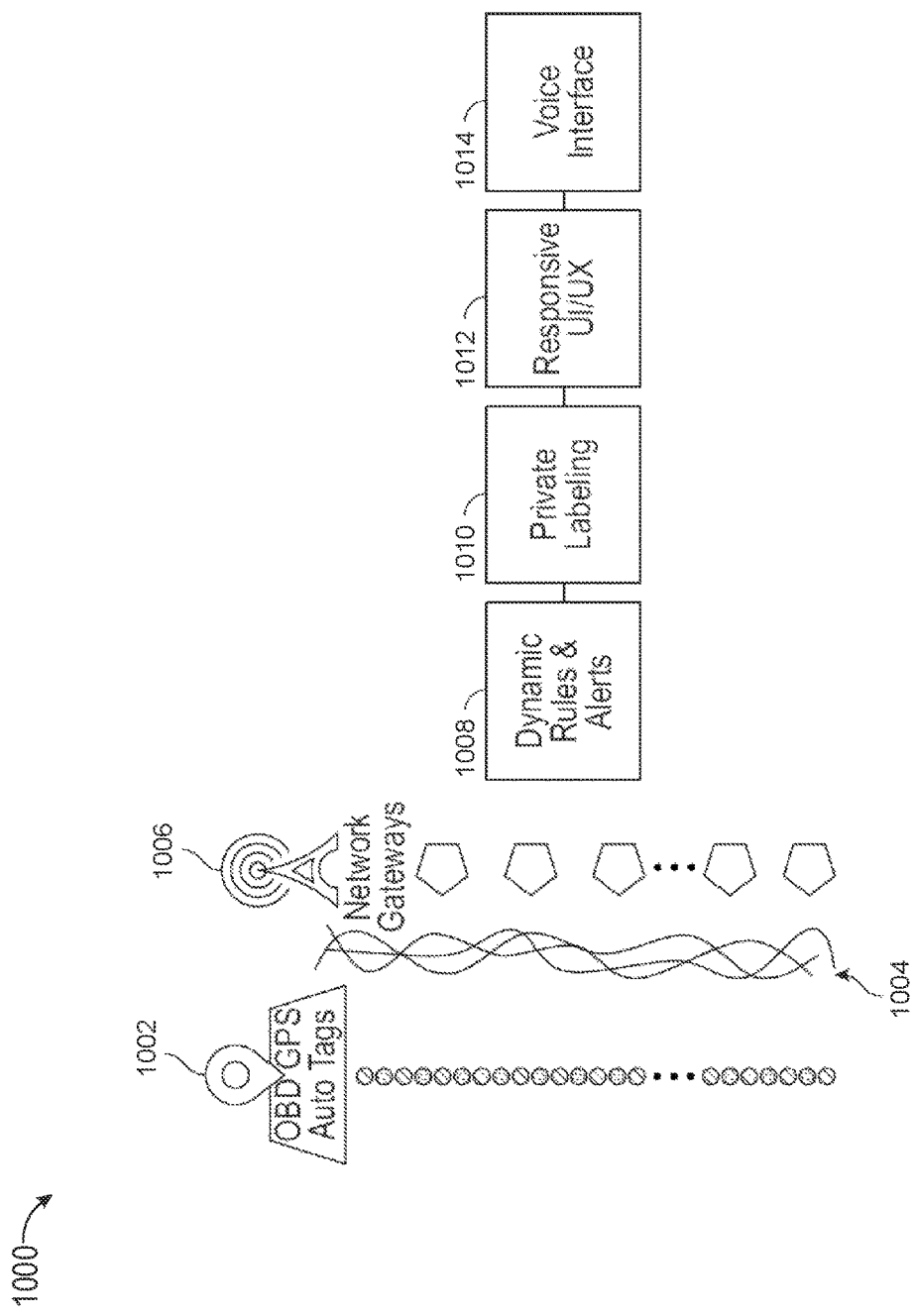

FIG. 10 is an example diagram for components of a remote asset detection system 1000 in accordance with one or more example embodiments of the disclosure. In some embodiments, the OBD tools 1002 may obtain data from the vehicle or via one or more components of the tools (e.g., GPS, accelerometer, etc.) and may transmit 1004 the data to one or more network gateways 1006. The data may be provided to visualization and control components for the remote asset detection system. In some embodiments, the components may include dynamic rules and alerts 1008, private labeling 1010, responsive user interfaces and user interactions 1012, and voice interfaces 1014. In some embodiments, the system may use distributed rules engines and a multi-model alerting system (e.g., email, text, audio, social, etc.). The user interfaces may be customizable and white labeled. The systems may have built-in integration with voice systems, such as Amazon Alexa and Google Home. Support for mobile, tablet, and desktop web applications plus native mobile applications may be provided. Interactive map displays with user-defined shapes, geo-filters, and contextual search may be provided.

Figure 11A:
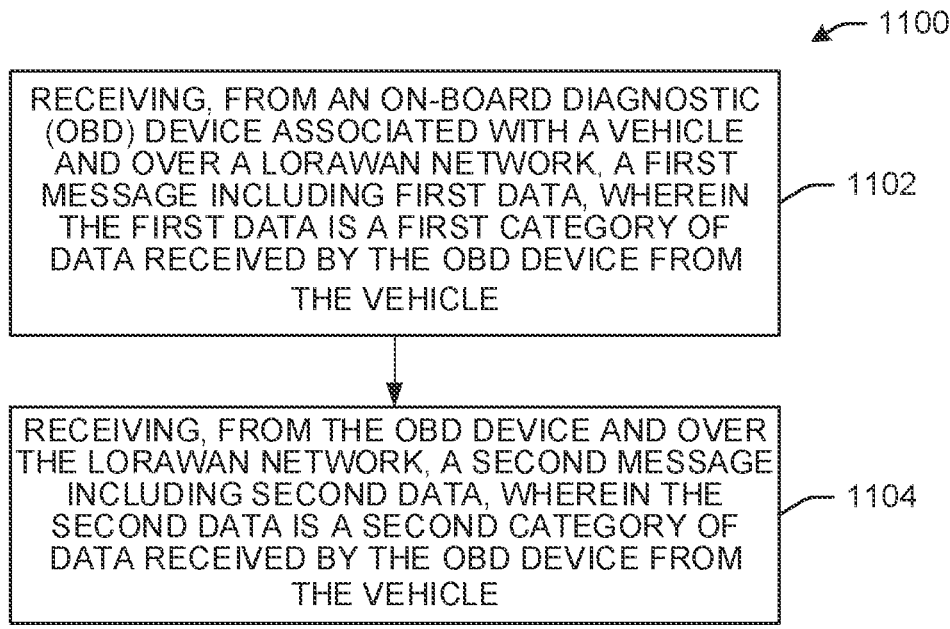
FIGS. 11A-11B are example methods for a remote asset detection system in accordance with one or more embodiments of the disclosure.
Figure 11B:
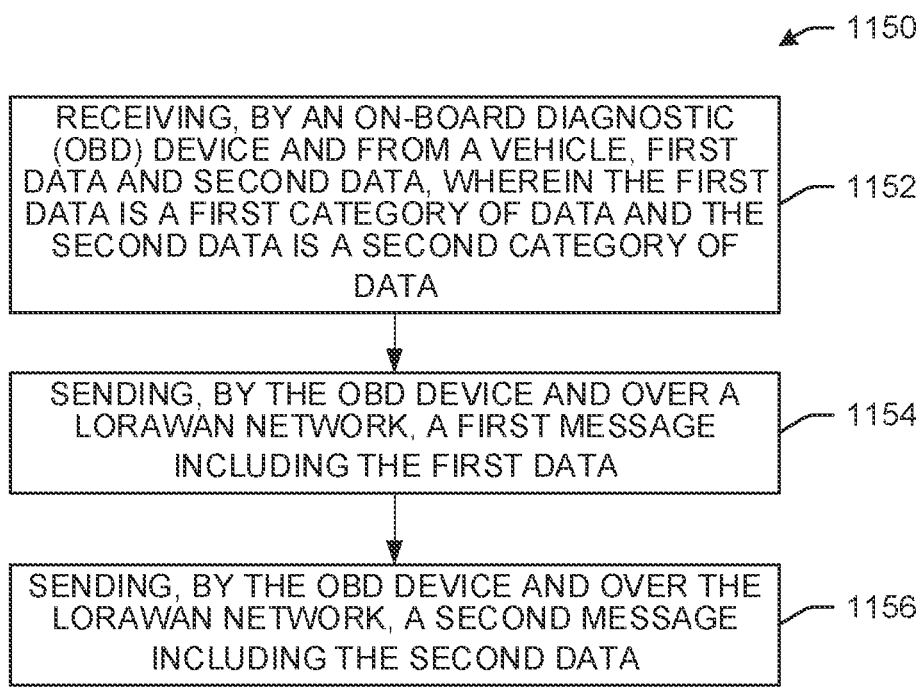

FIGS. 11A-11B are example methods (for example, method 1100 and method 1150), in accordance with one or more embodiments of the disclosure.

In one or more embodiments, FIG. 11A illustrates a method 1100 that may be performed by a remote system (such as remote system 120, and/or any other type of remote system described herein that may exchange data from with device, such as device 102, and/or any other device).

At block 1102, the method 1100 may include receiving, from an on-board diagnostic (OBD) device associated with a vehicle and over a LoRaWAN network, a first message including first data, wherein the first data is a first category of data received by the OBD device from the vehicle. At block 1104, the method 110 may include receiving, from the OBD device and over the LoRaWAN network, a second message including second data, wherein the second data is a second category of data received by the OBD device from the vehicle.

In one or more embodiments, the first category of data and the second category of data include at least one of: a pending diagnostic trouble code (DTC), a stored DTC, and/or a permanent DTC. In one or more embodiments, the first message and the second message also include a subset of a vehicle identification number (VIN) associated with the vehicle. In one or more embodiments, the first message and the second message also include an indication of a category of data, a total number of DTCs associated with the first category of data, a number of DTCs included within the first message, and/or an index of a first DTC within the first message. In one or more embodiments, the first message includes a first portion of the first data. The method 1100 may further include receiving, from the OBD device and over the LoRaWAN network, a third message including a second portion of the first data, and wherein the first message includes an indication that the second portion of the first data will be included in the third message. In one or more embodiments, the method 1100 may further include determining that the first message and the third message are associated with the vehicle and with the first category of data. The method 1100 may further include extracting the first portion of the first data from the first message and the second portion of the first data from the third message. The method 1100 may further include combining the first portion of the first data and the second portion of the first data. In one or more embodiments, the method 1100 may further include sending, to the OBD device, an indication of a location within a memory of the vehicle where the first category of data and the second category of data are located, wherein the location is based on a type of the vehicle.

In one or more embodiments, FIG. 11B illustrates a method 1150 that may be performed by a device (such as device 102 and/or any other device).

At block 1152, the method 1150 may include receiving, by an on-board diagnostic (OBD) device and from a vehicle, first data and second data, wherein the first data is a first category of data and the second data is a second category of data. At block 1154, the method 1150 may include sending, by the OBD device and over a LoRaWAN network, a first message including the first data. At block 1156, the method 1150 may include sending, by the OBD device and over the LoRaWAN network, a second message including the second data.

In one or more embodiments, the first message includes a first portion of the first data. The method 1150 may also include sending, from the OBD device and over the LoRaWAN network, a third message including a second portion of the first data, and wherein the first message includes an indication that the second portion of the first data will be included in the third message. The method 1150 may also include receiving, from a remote system, an indication of a location within a memory of the vehicle where the first category of data and the second category of data are located, wherein the location is based on a type of the vehicle, and wherein receiving the first data and second data is based on the indication.

One or more operations of the methods, process flows, or use cases of FIGS. 1-11 may have been described above as being performed by a user device, or more specifically, by one or more program module(s), applications, or the like executing on a device. It should be appreciated, however, that any of the operations of the methods, process flows, or use cases of FIGS. 1-11 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-11 may be described in the context of the illustrative devices, it should be appreciated that such operations may be implemented in connection with numerous other device configurations.

The operations described and depicted in the illustrative methods, process flows, and use cases of FIGS. 1-11 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-11 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

FIG. 12 is a schematic block diagram of one or more illustrative server(s) 1200 in accordance with one or more example embodiments of the disclosure. The server(s) 1200 may include any suitable computing device including, but not limited to, a server system, a mobile device such as a smartphone, a tablet, an e-reader, a wearable device, or the like; a desktop computer; a laptop computer; a content streaming device; a set-top box; or the like. The server(s) 1200 may correspond to an illustrative device configuration for the content selection servers of FIGS. 1-11.

The server(s) 1200 may be configured to communicate via one or more networks with one or more servers, user devices, or the like. The server(s) 1200 may be configured to receive data from one or more on-board diagnostic tools, analyze the data, provide the data via an interface to one or more entities, and/or generate alerts based on the data and predetermined rules.

The server(s) 1200 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server(s) 1200 may include one or more processors (processor(s)) 1202, one or more memory devices 1204 (generically referred to herein as memory 1204), one or more input/output (I/O) interfaces 1206, one or more network interfaces 1208, one or more sensors or sensor interfaces 1210, one or more transceivers 1212, one or more optional speakers 1214, one or more optional microphones 1216, and data storage 1220. The server(s) 1200 may further include one or more buses 1218 that functionally couple various components of the server(s) 1200. The server(s) 1200 may further include one or more antenna(e) 1234 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1218 may include at least one of a system bus, a memory bus, an address bus, or a message bus, and may permit the exchange of information (e.g., data (including computer-executable code), signaling, etc.) between various components of the server(s) 1200. The bus(es) 1218 may include, without limitation, a memory bus or a memory controller, a peripheral bus, an accelerated graphics port, and so forth. The bus(es) 1218 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1204 of the server(s) 1200 may include volatile memory (memory that maintains its state when supplied with power) such as random access memory (RAM) and/or nonvolatile memory (memory that maintains its state even when not supplied with power) such as read-only memory (ROM), flash memory, ferroelectric RAM (FRAM), and so forth. Persistent data storage, as that term is used herein, may include nonvolatile memory. In certain example embodiments, volatile memory may enable faster read/write access than nonvolatile memory. However, in certain other example embodiments, certain types of nonvolatile memory (e.g., FRAM) may enable faster read/write access than certain types of volatile memory.

In various implementations, the memory 1204 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1204 may include main memory as well as various forms of cache memory such as instruction cache(s), data cache(s), translation lookaside buffer(s) (TLBs), and so forth. Further, cache memory such as a data cache may be a multilevel cache organized as a hierarchy of one or more cache levels (L1, L2, etc.).

The data storage 1220 may include removable storage and/or nonremovable storage including, but not limited to, magnetic storage, optical disk storage, and/or tape storage. The data storage 1220 may provide nonvolatile storage of computer-executable instructions and other data. The memory 1204 and the data storage 1220, removable and/or nonremovable, are examples of computer-readable storage media (CRSM) as that term is used herein.

The data storage 1220 may store computer-executable code, instructions, or the like that may be loadable into the memory 1204 and executable by the processor(s) 1202 to cause the processor(s) 1202 to perform or initiate various operations. The data storage 1220 may additionally store data that may be copied to the memory 1204 for use by the processor(s) 1202 during the execution of the computer-executable instructions. Moreover, output data generated as a result of execution of the computer-executable instructions by the processor(s) 1202 may be stored initially in the memory 1204, and may ultimately be copied to the data storage 1220 for nonvolatile storage.

More specifically, the data storage 1220 may store one or more operating systems (O/S) 1222; one or more database management systems (DBMSs) 1224; and one or more program module(s), applications, engines, computer-executable code, scripts, or the like such as, for example, one or more data management module(s) 1226, one or more data analysis module(s) 1228, and/or one or more OBD module(s) 1230. Some or all these module(s) may be sub-module(s). Any of the components depicted as being stored in the data storage 1220 may include any combination of software, firmware, and/or hardware. The software and/or firmware may include computer-executable code, instructions, or the like that may be loaded into the memory 1204 for execution by one or more of the processor(s) 1202. Any of the components depicted as being stored in the data storage 1220 may support functionality described in reference to corresponding components named earlier in this disclosure.

The data storage 1220 may further store various types of data utilized by the components of the server(s) 1200. Any data stored in the data storage 1220 may be loaded into the memory 1204 for use by the processor(s) 1202 in executing computer-executable code. In addition, any data depicted as being stored in the data storage 1220 may potentially be stored in one or more datastore(s) and may be accessed via the DBMS 1224 and loaded in the memory 1204 for use by the processor(s) 1202 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 12, an example datastore(s) may include, for example, web content, advertisement campaigns, advertisements, content items, and/or other information.

The processor(s) 1202 may be configured to access the memory 1204 and execute the computer-executable instructions loaded therein. For example, the processor(s) 1202 may be configured to execute the computer-executable instructions of the various program module(s), applications, engines, or the like of the server(s) 1200 to cause or facilitate various operations to be performed in accordance with one or more embodiments of the disclosure. The processor(s) 1202 may include any suitable processing unit capable of accepting data as input, processing the input data in accordance with stored computer-executable instructions, and generating output data. The processor(s) 1202 may include any type of suitable processing unit including, but not limited to, a central processing unit, a microprocessor, a reduced instruction set computer (RISC) microprocessor, a complex instruction set computer (CISC) microprocessor, a microcontroller, an application specific integrated circuit (ASIC), a field-programmable gate array (FPGA), a systemon-a-chip (SoC), a digital signal processor (DSP), and so forth. Further, the processor(s) 1202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1202 may be capable of supporting any of a variety of instruction sets.

Referring now to functionality supported by the various program module(s) depicted in FIG. 12, the data management module(s) 1226 may include computer-executable instructions, code, or the like that responsive to execution by one or more of the processor(s) 1202 may perform functions including, but not limited to, receiving and transmitting data to OBD tools, asset management personnel, management entities, financial entities, and the like.

The data analysis module(s) 1228 may include computer-executable instructions, code, or the like that responsive to execution by one or more of the processor(s) 1202 may perform functions including, but not limited to, translating and analyzing data received from OBD tools and other sources. The data may be analyzed using machine-learning techniques and other data analysis mechanisms that may provide insight into the data obtained from the OBD tools.

The OBD module(s) 1230 may include computer-executable instructions, code, or the like that responsive to execution by one or more of the processor(s) 1202 may perform functions including, but not limited to, communicating with OBD tools, transmitting instructions, and managing firmware updates for the OBD tools.

Referring now to other illustrative components depicted as being stored in the data storage 1220, the O/S 1222 may be loaded from the data storage 1220 into the memory 1204 and may provide an interface between other application software executing on the server(s) 1200 and the hardware resources of the server(s) 1200. More specifically, the O/S 1222 may include a set of computer-executable instructions for managing hardware resources of the server(s) 1200 and for providing common services to other application programs (e.g., managing memory allocation among various application programs). In certain example embodiments, the O/S 1222 may control execution of the other program module(s) to dynamically enhance characters for content rendering. The O/S 1222 may include any operating system now known or which may be developed in the future including, but not limited to, any server operating system, any mainframe operating system, or any other proprietary or non-proprietary operating system.

The DBMS 1224 may be loaded into the memory 1204 and may support functionality for accessing, retrieving, storing, and/or manipulating data stored in the memory 1204 and/or data stored in the data storage 1220. The DBMS 1224 may use any of a variety of database models (e.g., relational model, object model, etc.) and may support any of a variety of query languages. The DBMS 1224 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the server(s) 1200 is a mobile device, the DBMS 1224 may be any suitable lightweight DBMS optimized for performance on a mobile device.

Referring now to other illustrative components of the server(s) 1200, the input/output (I/O) interface(s) 1206 may facilitate the receipt of input information by the server(s) 1200 from one or more I/O devices as well as the output of information from the server(s) 1200 to one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server(s) 1200 or may be separate. The I/O devices may further include, for example, any number of peripheral devices such as data storage devices, printing devices, and so forth.

The I/O interface(s) 1206 may also include an interface for an external peripheral device connection such as a universal serial bus (USB), FireWire, Thunderbolt, Ethernet port, or other connection protocol that may connect to one or more networks. The I/O interface(s) 1206 may also include a connection to one or more of the antenna(e) 1234 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, etc.

The server(s) 1200 may further include one or more network interface(s) 1208 via which the server(s) 1200 may communicate with any of a variety of other systems, platforms, networks, devices, and so forth. The network interface(s) 1208 may enable communication, for example, with one or more wireless routers, one or more host servers, one or more web servers, and the like via one or more networks.

The antenna(e) 1234 may include any suitable type of antenna depending, for example, on the communications protocols used to transmit or receive signals via the antenna (e) 1234. Non-limiting examples of suitable antennae may include directional antennae, nondirectional antennae, dipole antennae, folded dipole antennae, patch antennae, multiple-input multiple-output (MIMO) antennae, or the like. The antenna(e) 1234 may be communicatively coupled to one or more transceivers 1212 or radio components to which or from which signals may be transmitted or received.

As previously described, the antenna(e) 1234 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1234 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1234 may be configured to transmit or receive radio frequency signals within any suitable frequency range forming part of the unlicensed portion of the radio spectrum.

The antenna(e) 1234 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1212 may include any suitable radio component(s) for—in cooperation with the antenna(e) 1234—transmitting or receiving radio frequency (RF) signals in the bandwidth and/or channels corresponding to the communications protocols utilized by the server(s) 1200 to communicate with other devices. The transceiver(s) 1212 may include hardware, software, and/or firmware for modulating, transmitting, or receiving—potentially in cooperation with any of antenna(e) 1234—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1212 may further include hardware, firmware, or software for receiving GNSS signals. The transceiver(s) 1212 may include any known receiver and baseband suitable for communicating via the communications protocols utilized by the server(s) 1200. The transceiver(s) 1212 may further include a low noise amplifier (LNA), additional signal amplifiers, an analog-to-digital (A/D) converter, one or more buffers, a digital baseband, or the like.

The sensor(s)/sensor interface(s) 1210 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 1214 may be any device configured to generate audible sound. The microphone(s) 1216 may be any device configured to receive analog sound input or voice data.

It should be appreciated that the program module(s), applications, computer-executable instructions, code, or the like depicted in FIG. 12 as being stored in the data storage 1220 are merely illustrative and not exhaustive and that processing described as being supported by any particular module may alternatively be distributed across multiple module(s) or performed by a different module. In addition, various program module(s), script(s), plug-in(s), application programming interface(s) (API(s)), or any other suitable computer-executable code hosted locally on the server(s) 1200, and/or hosted on other computing device(s) accessible via one or more networks, may be provided to support functionality provided by the program module(s), applications, or computer-executable code depicted in FIG. 12 and/or additional or alternate functionality. Further, functionality may be modularized differently such that processing described as being supported collectively by the collection of program module(s) depicted in FIG. 12 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 12 may be implemented, at least partially, in hardware and/or firmware across any number of devices.

It should further be appreciated that the server(s) 1200 may include alternate and/or additional hardware, software, or firmware components beyond those described or depicted without departing from the scope of the disclosure. More particularly, it should be appreciated that software, firmware, or hardware components depicted as forming part of the server(s) 1200 are merely illustrative and that some components may not be present or additional components may be provided in various embodiments. While various illustrative program module(s) have been depicted and described as software module(s) stored in the data storage 1220, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-11 may be performed by a device having the illustrative configuration depicted in FIG. 12, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-15 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-15 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system comprising:
one or more processors; and
memory storing computer-executable instructions, that when executed by the processor, cause the processor to:
receive, by an on-board diagnostic (OBD) device and from a vehicle, first data and second data, wherein the first data is a first category of data and the second data is a second category of data;
create a first packet including a first portion of the first data;
determine a maximum amount of the first data that fits within the first packet, wherein the maximum amount of the first data is less than a size of the first data;
create, based on the maximum amount being less than the size of the first data, a second packet including a second portion of the first data, wherein the first packet includes a field indicating that the second portion of the first data is included in the second packet, wherein the first packet and the second packet include an indication of a category of data, a hash of a vehicle identification number (VIN) associated with the vehicle, a total number of DTCs associated with the first category of data, a number of DTCs included within the first packet, and an index of a first DTC within the first packet;
send, by the OBD device and over a LoRaWAN network, the first packet and the second packet; and
send, by the OBD device and over the LoRaWAN network, a third packet including the second data.

2. The system of claim 1, wherein the first category of data and the second category of data include at least one of: a pending diagnostic trouble code (DTC), a stored DTC, and/or a permanent DTC.

3. The system of claim 1, wherein the computer-executable instructions further cause the one or more processors to:
receive, from a remote system, an indication of a location within a memory of the vehicle where the first category of data and the second category of data are located, wherein the location is based on a type of the vehicle, and wherein receiving the first data and second data is based on the indication.

4. A method comprising:
receiving, from an on-board diagnostic (OBD) device associated with a vehicle and over a LoRaWAN network, a first message including a first portion of first data, wherein the first data is a first category of data received by the OBD device from the vehicle;
receiving, from the OBD device and over the LoRaWAN network, a second message including a second portion of the first data, wherein the second portion of the first data is included in the second message based on a determination that a maximum amount of the first data that fits within the first message is less than a size of the first data, and wherein the first message includes a field indicating that the second portion of the first data is included in the second message, wherein the first message and the second message include an indication of a category of data, a hash of a vehicle identification number (VIN) associated with the vehicle, a total number of DTCs associated with the first category of data, a number of DTCs included within the first message, and an index of a first DTC within the first message; and
receiving, from the OBD device and over the LoRaWAN network, a third message including second data, wherein the second data is a second category of data received by the OBD device from the vehicle.

5. The method of claim 4, wherein the first category of data and the second category of data include at least one of: a pending diagnostic trouble code (DTC), a stored DTC, and/or a permanent DTC.

6. The method of claim 5, further comprising:
determining that the first message and the third message are associated with the vehicle and with the first category of data;
extracting the first portion of the first data from the first message and the second portion of the first data from the third message; and
combining the first portion of the first data and the second portion of the first data.

7. The method of claim 4, further comprising:
sending, to the OBD device, an indication of a location within a memory of the vehicle where the first category of data and the second category of data are located, wherein the location is based on a type of the vehicle.

8. A non-transitory computer-readable medium storing computer-executable instructions, that when executed by one or more processors, cause the one or more processors to perform operations of:
receiving, from an on-board diagnostic (OBD) device associated with a vehicle and over a LoRaWAN network, a first message including a first portion of first data, wherein the first data is a first category of data received by the OBD device from the vehicle;
receiving, from the OBD device and over the LoRaWAN network, a second message including a second portion of the first data, wherein the second portion of the first data is included in the second message based on a determination that a maximum amount of the first data that fits within the first message is less than a size of the first data, and wherein the first message includes a field indicating that the second portion of the first data is included in the second message, wherein the first message and the second message include an indication of a category of data, a hash of a vehicle identification number (VIN) associated with the vehicle, a total number of DTCs associated with the first category of data, a number of DTCs included within the first message, and an index of a first DTC within the first message; and
receiving, from the OBD device and over the LoRaWAN network, a third message including second data, wherein the second data is a second category of data received by the OBD device from the vehicle.

9. The non-transitory computer-readable medium of claim 8, wherein the first category of data and the second category of data include at least one of: a pending diagnostic trouble code (DTC), a stored DTC, and/or a permanent DTC.

10. The non-transitory computer-readable medium of claim 9, wherein the computer-executable instructions further cause the one or more processors to perform operations of:
determining that the first message and the third message are associated with the vehicle and with the first category of data;
extracting the first portion of the first data from the first message and the second portion of the first data from the third message; and
combining the second portion of the first data and the second portion of the first data.

11. The non-transitory computer-readable medium of claim 8, wherein the computer-executable instructions further cause the one or more processors to perform operations of:
- sending, to the OBD device, an indication of a location within a memory of the vehicle where the first category of data and the second category of data are located, wherein the location is based on a type of the vehicle.

12. The system of claim 1, wherein the computer-executable instructions further cause the one or more processors to:
- receive, by a receiving device, the first packet and the second packet;
- determine that a first VIN hash included in the second packet is a same VIN hash as a second VIN hash included in the first packet; and
- determine, based on determining that the first VIN hash is a same VIN hash as the second VIN hash, that the first packet and second packet include related data.

13. The system of claim 1, wherein a frequency of data transmission by the OBD device over the LoRaWAN network is based on a battery level of vehicle.

* * * * *